United States Patent [19]
Viesselmann et al.

[11] Patent Number: 5,622,104
[45] Date of Patent: Apr. 22, 1997

[54] CYLINDRICAL BALER HAVING HYDRAULIC CIRCUIT FOR CONTROLLING BALE DENSITY AND TAILGATE OPERATION

[75] Inventors: Kim P. Viesselmann, Grafton, Wis.; Steven J. Henderson, Madison, S. Dak.

[73] Assignee: Gehl Company, West Bend, Wis.

[21] Appl. No.: 519,778

[22] Filed: Aug. 28, 1995

[51] Int. Cl.$^6$ .......................... B30B 5/06; A01D 39/00; A01F 15/00
[52] U.S. Cl. .................. 100/88; 56/341; 100/99
[58] Field of Search ........................ 100/5, 76, 87, 100/88, 43, 99; 56/341

[56] References Cited

U.S. PATENT DOCUMENTS

| | | |
|---|---|---|
| 4,257,219 | 3/1981 | Burrough et al. ............ 56/341 |
| 4,545,298 | 10/1985 | Viaud .......................... 100/88 |
| 5,025,717 | 6/1991 | Viaud et al. ................. 100/88 |
| 5,025,718 | 6/1991 | Viaud et al. ................. 100/88 |
| 5,134,839 | 8/1992 | Clostermeyer et al. ..... 100/88 |
| 5,165,332 | 11/1992 | Lee ............................. 100/88 |
| 5,263,410 | 11/1993 | Olin ............................ 100/88 |
| 5,367,865 | 11/1994 | Jennings et al. ............ 56/341 |

FOREIGN PATENT DOCUMENTS 981915  1/1976  Canada ......................... 56/341

*Primary Examiner*—Stephen F. Gerrity
*Attorney, Agent, or Firm*—Andrus, Sceales, Starke & Sawall

[57] ABSTRACT

A cylindrical baler is comprised of an adjustable bale forming chamber for forming spirally wound, cylindrical bales. A completed bale is discharged on the ground through a rear tailgate. The chamber is defined by a plurality of belts supported on a system of rollers. Tensioning cylinders are mounted on each side of the baler to provide variable bale density and tailgate cylinders are positioned on the rear of the baler to actuate the tailgate after a bale is formed. A two-way proportional valve acts alone or in cooperation with an adjustable rotary valve and an adjustable relief valve to coordinate the flow, to vary the belt tension, and to open and close the tailgate.

22 Claims, 4 Drawing Sheets

CYLINDRICAL BALER HAVING HYDRAULIC CIRCUIT FOR CONTROLLING BALE DENSITY AND TAILGATE OPERATION

FIELD OF OPERATION

This invention relates generally to a machine for forming cut crop into cylindrical bales and, more particularly, relates to machines for controlling the density of the bales, the ejection of the bales and the opening/closing of a baler tailgate.

BACKGROUND OF THE INVENTION

One well known type of cylindrical baler comprises at least one set of longitudinally extending side-by-side belts supported on a plurality of transverse rollers. The belts and rollers define an expandable chamber for forming cylindrical, spirally round bales of crops such as hay and forage. To form a bale, the crops are picked up from the ground as the baler moves across the field. When the bale reaches a predetermined diameter, it is bound by being wrapped in twine, netting or the like in the bale forming chamber. The bale is then discharged onto the ground through a rear tailgate. A hydraulic circuit is selectively operated to maintain tension in the compacting belt arrangement during bale formation and to open and close the tailgate following bale formation.

One example of a cylindrical baler of this type is disclosed in U.S. Pat. No. 4,545,298 issued Oct. 8, 1985 to Viaud. In this arrangement, a directional control valve, an adjustable discharge valve, a non-return valve, and a pressure limiting valve are all required to operate between a pair of cylinders to control variable tension on the bale and to open and close the tailgate. Another example of this basic arrangement is shown in U.S. Pat. No. 5,025,718 issued Jun. 25, 1991 to Viaud et al. In this disclosure, a directional control valve, a bypass solenoid valve, an adjustable high pressure relief valve, and a gate valve operate in concert to form variable density bales and provide actuation of the tailgate. The solenoid valve as used in the latter arrangement is employed primarily to regulate hydraulic fluid direction rather than control hydraulic fluid pressure.

Realizing the limitations of the prior art, it is desirable to improve upon the aforementioned arrangements by eliminating the directional control valve and by employing a single proportional valve which maintains a predetermined pressure of the tensioning cylinder or between the tensioning cylinder and the tailgate cylinder, and controls, inter alia, the density of the formed bales.

Accordingly, it is a general aim of the invention to supply a hydraulic circuit employing a proportional valve and a series of check valves to control oil flow and pressure to and from the hydraulic cylinders which apply tension to the bale forming arrangement and open/close the tailgate before and after bale ejection. It is further desirable to provide a hydraulic circuit in which one power source is utilized to maintain tension on the compacting belts, open and close the tailgate during bale ejection, and positively return the belt take-up device to the start position of the bale forming cycle. It is also within the purview of the invention to provide a solenoid type proportional valve which allows a bale density setting to be made from a control unit remote from the baler.

SUMMARY OF THE INVENTION

The present invention advantageously provides a cylindrical baler which employs a single, simplified hydraulic circuit for consolidating the flow control, bale density regulation, and hydraulic cylinder actuation required in a baling operation. The multiple tasks of responding to pressure demands, maintaining the necessary resistance on the bale forming belts and coordinating the opening/closing of the tensioning and tailgate cylinders are effectively combined in a proportional valve acting together with an array of check valves between the tensioning and tailgate cylinders.

In accordance with one aspect of the invention, a cylindrical baler for processing cylindrical bales comprises a front section, a rear discharge tailgate connected to the front section, and a plurality of guide and tensioning rollers in the front section and rear tailgate. A plurality of belts is supported on and extends around the rollers for defining an expandable bale forming chamber and providing variable bale density. The tailgate is movable between an open position for bale discharge and a closed position for bale formation. Tensioning cylinders are provided for enabling variable tension of the belts during bale formation and tailgate cylinders are included for providing actuation of the tailgate between the open position and the closed position. A pressurized fluid source supplies fluid to and returns fluid from the tensioning cylinders and the tailgate cylinders. A fluid circuit arrangement includes a singular, two-way, proportional valve connected with a supplementary valve arrangement and located between the tensioning cylinders and the tailgate cylinders for controlling pressure requirements between the tensioning cylinders and the tailgate cylinders, for controlling the variable bale density during bale formation, and for opening and closing the tailgate following the bale formation.

In another aspect of the invention, there is provided a machine for forming cylindrical bales of crop having a variable volume baling chamber and a hydraulic system which includes a tensioning cylinder for providing variable bale density, a tailgate cylinder for enabling discharge of a formed bale from the baling chamber and a source of hydraulic fluid connectable to a rod end and a piston end of each tensioning cylinder and tailgate cylinder. A proportional valve is connected between the tensioning cylinder and the tailgate cylinder. A first fluid flow path having a first part supplies hydraulic fluid to the piston end of the tailgate cylinder and a second part returns hydraulic fluid from the rod end of the tailgate cylinder to the source. A second fluid path having a first part supplies hydraulic fluid to the rod end of the tailgate cylinder and a second part returns fluid from the piston end of the tailgate cylinder to the source. A third fluid path having a first part supplies fluid from one of the first and second fluid paths to the proportional valve and a second part returns fluid from the proportional valve to the source. A fourth fluid path having a first part supplies fluid from one of the first and second fluid paths through the proportional valve to the rod end of the tensioning cylinder and a second part returns fluid from the piston end of the tensioning cylinder to the source. A fifth fluid path interconnects the first fluid path and the second fluid path.

In yet a further aspect of the invention, a cylindrical baler for processing cylindrical bales comprises a front section, a rear discharge tailgate pivotally connected to the front section, a plurality of guide and tensioning rollers in the front section and rear tailgate and a plurality of belts supported on and extending around the rollers for defining an expandable bale forming chamber and providing variable bale density. The tailgate is movable between an open position for bale discharge and a closed position for bale formation. Tensioning cylinders are included for providing variable tension in the belts during bale formation and tailgate cylinders are included for providing actuation of the tailgate between the open position and the closed position. Each of the tensioning cylinders and the tailgate cylinders has a rod end and a piston end to which and from which a fluid source flows. A fluid circuit arrangement including a proportional valve, an adjustable rotary valve connected to the proportional valve and an adjustable relief valve connected to the rotary valve is located between the tensioning cylinder and the tailgate cylinder. During bale formation, fluid flows initially from the rod end of each tensioning cylinder through the rotary valve, through the proportional valve and back to the piston end of each tensioning cylinder until the bale reaches a predetermined size after which fluid flows through the relief valve to the piston end of each tensioning cylinder. During a bale ejection phase, fluid flows from the source to the piston end of each tailgate cylinder and from the rod end of each tailgate cylinder back to the source. After the bale is ejected, fluid flows from the source to the rod end of each tailgate cylinder and from the piston end of each tailgate cylinder to the source. Depending on the pressure demands between the rod end of each tensioning cylinder and the proportional valve, fluid flows through the proportional valve and returns to the source.

In yet another aspect of the invention, a cylindrical baler for processing cylindrical bales comprises a front section, a rear discharge tailgate connected to the front section, and a plurality of guide and tensioning rollers in the front section and rear tailgate. A plurality of belts is supported on and extends around the rollers for defining an expandable bale forming chamber and providing variable bale density. Tensioning cylinders are provided for enabling variable tension of the belts during bale formation. A pressurized fluid source supplies fluid to and returns fluid from the tensioning cylinders. A fluid circuit arrangement includes a singular, solenoid valve for controlling the pressure requirements of the tensioning cylinders and the variable bale density during bale formation.

BRIEF DESCRIPTION OF THE DRAWINGS

The invention will become better understood by reference to the following detailed description of the preferred exemplary embodiment when read in conjunction with the appended drawing wherein like numerals denote like elements.

DETAILED DESCRIPTION OF THE PREFERRED EMBODIMENTS

The present invention is an improvement over the subject matter of U.S. Pat. No. 4,257,219 which utilizes an on-off valve and an adjustable valve in parallel for maintaining tension in the compacting belts of a round baler. A portion of the structure and operation of the device of the patent is similar to that of the present invention and a greatly detailed description of the baler is thereby deemed to be neither necessary nor desirable, but reference may be had to said patent if such is desired. It is believed sufficient to say for purposes of this disclosure that a cylindrical bale forming machine which embodies the present invention includes a mobile frame F which is supported in elevated and transportable position over the ground by the ground engaging wheels W. A tongue structure (not shown) extends forwardly of the frame and has its forward end connected to a conventional towing vehicle, such as a tractor, not shown. Power is supplied to the baling machine from the power take-off shaft of the tractor, which is adapted to be connected to the machine for operating various mechanisms thereof.

Figure 1:
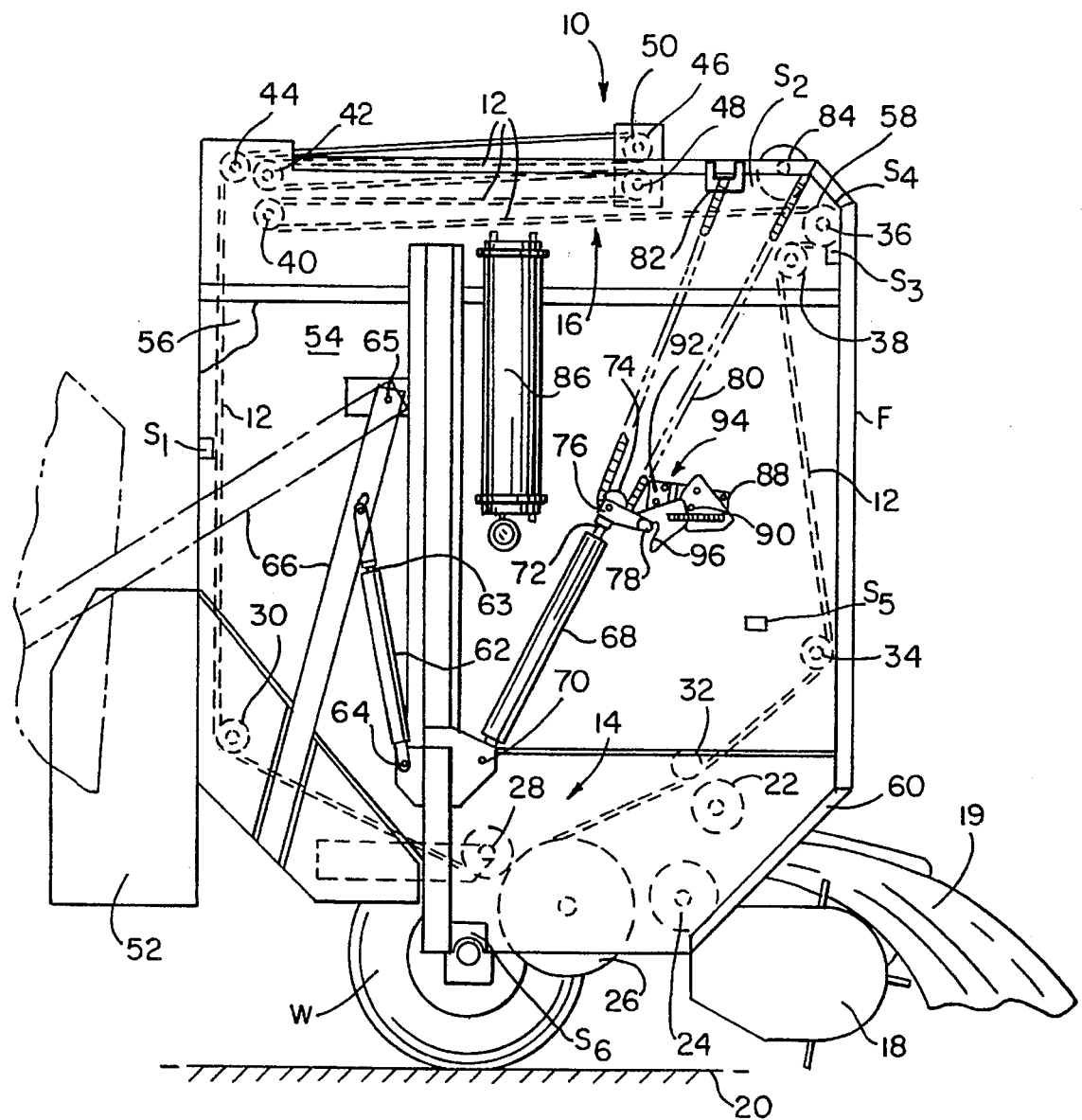
FIG. 1 is a side elevational view of a round baler employing the hydraulic circuit embodying the present invention.

FIG. 1 illustrates a variable chamber round baler 10 which includes a series of side-by-side endless belts 12 which cooperate during operation of baler 10 to define an internal bale forming chamber, in a manner as is known.

In accordance with the known construction of a baler of this type, baler 10 further includes a take-up assembly 16 for accommodating variations in the size of a bale forming chamber, and a crop pick-up mechanism 18 for picking up a windrow of crop material 19 from the ground 20 and feeding crop material 19 rearwardly towards the entrance of the bale forming chamber 14. A pair of crop inlet rollers 22, 24 are located rearwardly of the pick-up mechanism 18 and forwardly of a floor roller 26. Inlet rollers 22, 24 assist in moving crop material 19 rearwardly towards the opening of the bale forming chamber, and floor roller 26 rotates counter-clockwise below the bale forming chamber to rotate a bale in a clockwise direction during bale formation.

Baler 10 further includes a lower front gate roller 28 and a lower rear gate roller 30. The belts 12 of baler 10 are wrapped around front gate roller 28 and help to define the bale forming chamber between front gate roller 28 and a roller 32, with the opening into the bale forming chamber being located between rollers 28 and 32. Belts 12 are further trained about drive rollers 34, 36, idler roller 38, tailgate rollers 40, 42, 44 and also around shuttle rollers 46, 48, the latter two of which are journaled on a longitudinally movable shuttle 50. Shuttle 50 is a shiftable means guided for fore and aft movement on top of the baler according to the size of the bale, as is well known.

A wrap material dispensing system, generally indicated at 52, is mounted to a lower rear portion of the baler 10. As is known, system 52 cooperates with belts 12 to supply wrap material such as twine, plastic film, extruded web material or netted-type material into bale forming chamber 14 for wrapping around a bale after the bale is fully formed to a desired size.

The main frame of baler 10 includes a pair of vertically disposed and spaced apart side walls 54, 56 which are held apart in spaced relationship to each other by cross members 58, 60. A pair of large hydraulic tailgate cylinders 62 having rod ends 63 are pivoted at 64 to the frame, there being one cylinder on each side of the machine. Cylinders 62 are connected at their other ends to a frame member 66 so the extension of these hydraulic cylinders acts to swing the rear end or tailgate of the baler 10 about the pivot point 65 to thereby open the rear end of the machine to discharge the completely formed bale in a known manner.

In accordance with one aspect of the present invention, a hydraulic control means is provided for controlling the bale density when building a bale, for opening and closing the tailgate during bale ejection, and for positively returning the belt take-up device to the start position of the bale forming cycle. These functions are obtained through the use of a proportional valve of either the mechanical type or solenoid type. The circuit is designed so that one power source can be employed to open and close the tailgate during bale ejection and to positively return the belt to a starting position of the bale forming cycle.

The control mechanism provided by the present invention includes hydraulic cylinder means in the form of large, extensible tensioning cylinders 68, one mounted on each side of the baler 10 and pivoted at their lower cylinder ends such as at 70 to the frame of the machine. Referring to one of these cylinders 68, its rod end 72 has a chain sprocket 74 rotatably mounted thereon by means of a bracket 76. The outer end of bracket 76 has a roller 78 journaled thereon. Flexible connecting means in the form of a sprocket chain 80 extends around sprocket 74 and one of its ends is anchored at 82 to the baler frame. The sprocket chain 80 extends around a larger sprocket 84 journaled on the frame of the machine and the other end of the sprocket chain 80 is anchored on shuttle 50. A similar chain and sprocket arrangement is provided for the cylinder 68 on the other side of the machine. A supplementary accumulator 86 is mounted on the machine and contains hydraulic fluid such as oil in the lower portion thereof, while the upper portion of accumulator 86 contains air under pressure thus constituting an air over oil or pressurized fluid accumulator.

The hydraulic control mechanism also includes a mechanical type proportional valve 88, a normally open rotary valve 90, and an adjustable relief valve 92 positioned on a manifold 94 having a bifurcated arm 96 secured thereto. The bifurcated arm 96 is engageable with roller 78 carried by piston rod 72 when the cylinder 68 has been extended. Complete extension of rod 72 cause rotary valve 90 to move to the closed position, and complete retraction of rod 72 causes rotary valve 90 to move to the open position.

Figure 2:
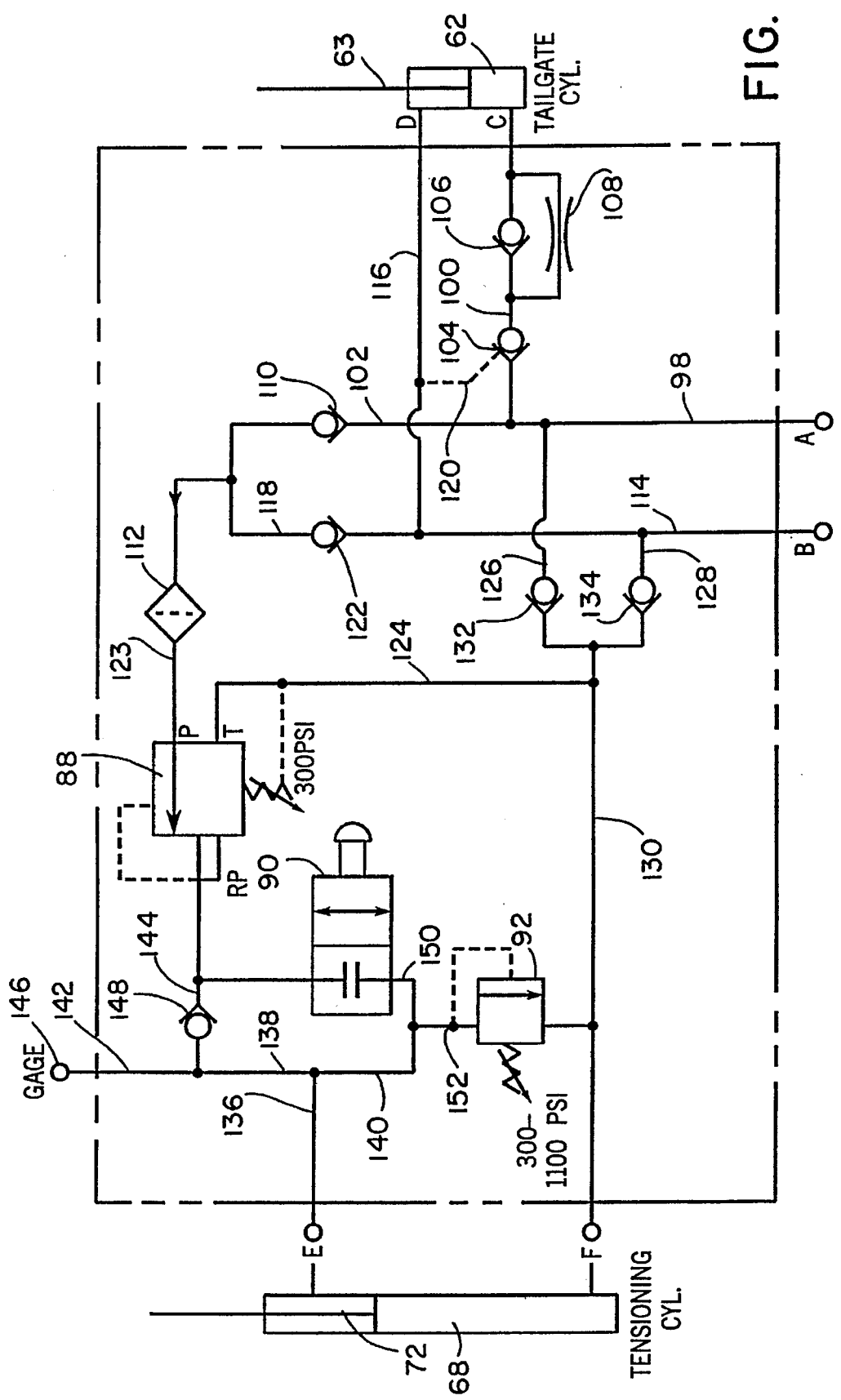
FIG. 2 is a schematic diagram of the hydraulic circuit provided by the present invention.

Referring now to FIG. 2, a first supply/return line 98 extending from hydraulic source A typically provided by the tractor has a first branch 100 and a second branch 102. Branch 100 includes a check valve 104, as well as a check valve 106 in parallel with a flow orifice 108 and terminates at the piston end C of each tailgate cylinder 62. Branch 102 includes a check valve 110 and a filter 112 and terminates at inlet port P of proportional valve 88. A second supply/return line 114 extending from hydraulic source B typically provided by the tractor has a first part 116 and a second part 118. First part 116 extends directly to the rod end D of each tailgate cylinder 62 and includes a branch 120 leading to check valve 104. Second part 118 includes a check valve 122 and merges with branch 102. The outlet port T of proportional valve 88 includes a line 124 having branches 126, 128 and 130. Branch 126 extends through a check valve 132 and is joined to line 98. Branch 128 extends through a check valve 134 and is joined to line 114. Branch 130 connects directly to the piston end F of each tensioning cylinder 68. The rod end E of each tensioning cylinder 68 is provided with a line 136 divided into two branches 138 and 140. Branch 138 is further subdivided into lines 142 and 144. Line 142 terminates in a pressure gauge 146 while line 144 includes a check valve 148 and terminates at inlet port RP of proportional valve 88. Branch 140 is also subdivided into two lines 150 and 152. Line 150 includes rotary valve 90 and connects to line 144 while line 152 includes relief valve 92 and joins branch 130.

In operation, before the bale starts to form, oil passes through rotary valve 90. With rotary valve 90 open, oil takes the path of least resistance from each rod end E via line 136, branch 140 and line 150 through valve 90 to solenoid valve 88 and returns via line 124 and branch 130 to each piston end F. Depending on the setting of valve 88, this produces a low level of tension on the compacting belts during the initial bale starting phase of the baling cycle.

When the bale formation commences and the bale starts to rotate and reaches a predetermined size, valve 90 is closed and oil from each tensioning cylinder 68 is forced via line 136, branch 140 and line 152 through relief valve 92 and returns via branch 130 to each piston end F. It should be understood that the pressure of relief valve 92 is set at a suitably high pressure which will result in high compacting tension while the bale is relatively small and consequently results in increased bale density. In this manner, the means to actuate the adjustable relief valve 92 is governed by the extended tensioning cylinder length which is directly related to the bale size.

As the bale continues to grow, the shuttle 50 travels rearwardly along the top of the baler 10, thereby causing each tensioning cylinder 68 to further extend. When the bale has reached maximum size, and the shuttle has been moved to the fully rearward position, each hydraulic cylinder 68 is fully extended. When the bale has thus been fully formed and wrapped by system 52, it is ready to be ejected from the tailgate or rear of the baler 10.

In order to open the tailgate, oil flows from the source at A through line 98 and seeks the path of least resistance. That is, oil flows either through check valves 104, 106 in branch 100 to piston end C of each cylinder 62 to force the tailgate open, or the oil will flow through check valve 110 and filter 112 n branch 102 to proportional valve 88. Upon fulfilling the demand or pressure and flow requirements between inlet port RP on valve 88 and rod end E of each tensioning cylinder 68, oil will flow from outlet port T of valve 88 through line 124, check valve 134, branch 128 and line 114 for return to the source at B. During this mode, each tensioning cylinder 68 may be forced to retract by the regulated pressure at E. As each cylinder 68 is retracted, oil is forced out of each piston end F through branch 130, check valve 134, branch 128 and line 114 for return to the source at B.

Once the bale is ejected, the tailgate is closed by introducing oil at B through line 114. Again seeking the path of least resistance, oil may flow through part 116 directly to rod end D to retract each tailgate cylinder 62 as soon as a pressure is achieved through branch 120 which will unseat check valve 104 and permit oil to be exhausted from piston end C through flow orifice 108 and check valve 104 through line 98 to the source at A. Orifice 108 slows the flow of oil from each piston end C to effectively cushion the closing of the tailgate. Oil that does not flow through part 116 flows through check valve 122 and filter 112 via part 118 to proportional valve 88 and supplies the demand pressure requirements between inlet port RP of solenoid valve 88 and rod end E of each tensioning cylinder 68. Once those demands are met, the oil flows from outlet port T of valve 88 through line 124, check valve 132, branch 126 and line 98 back to the source at A. During this mode, each tensioning cylinder 68 may be forced to retract, causing oil from the piston end F to be forced out via branch 130, check valve 132, branch 126 and line 98 to the source at A.

Figure 3:
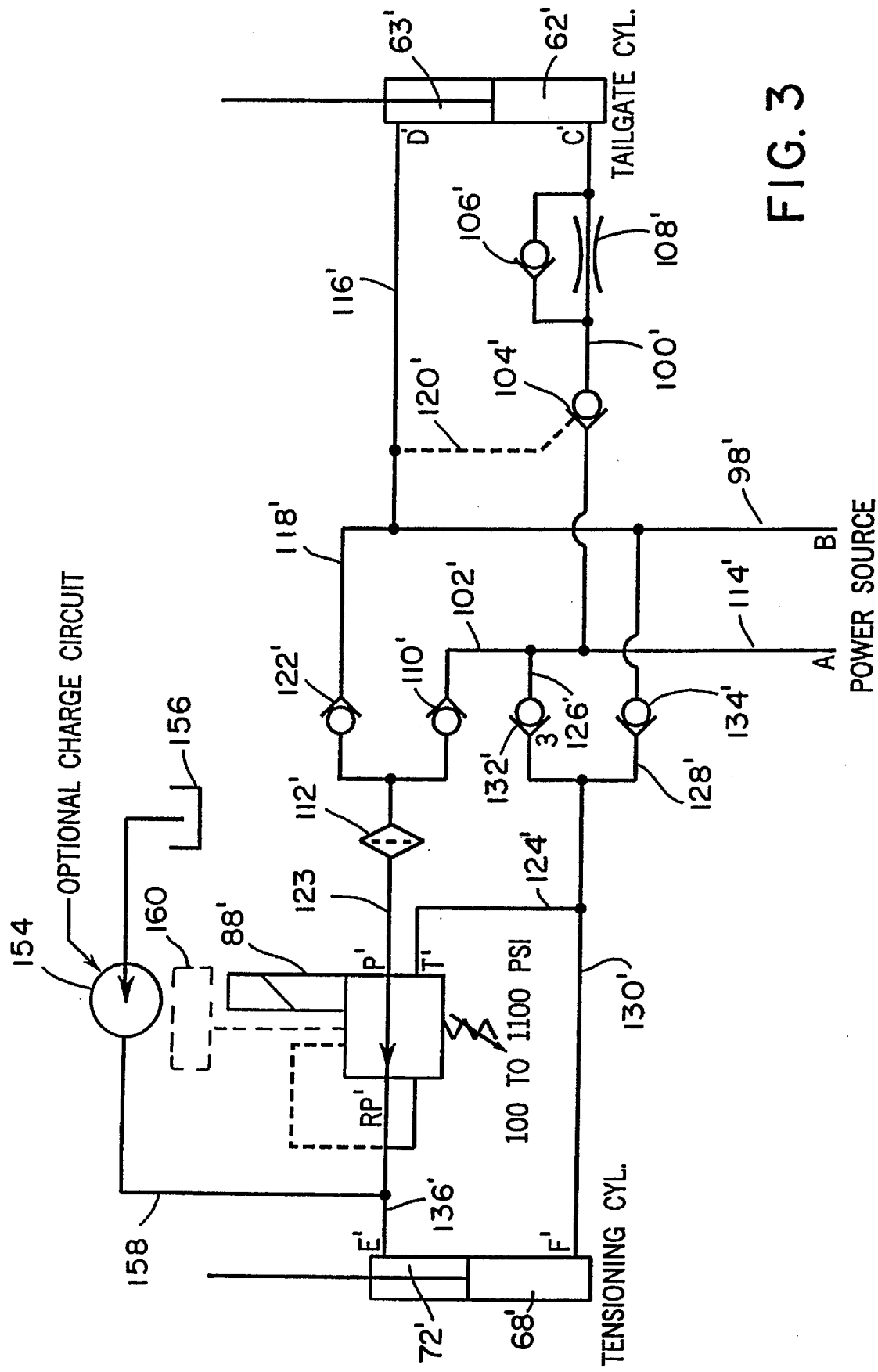
FIG. 3 is a schematic diagram of a first alternative hydraulic circuit provided by the invention.

In accordance with a further aspect of the invention, instead of employing a mechanical type proportional valve 88, rotary valve 90 and relief valve 92, a single electrical type, solenoid proportional valve 88' can be used as depicted in FIG. 3. In contrast with the mechanical type proportional valve 88, solenoid valve 88' allows a bale density setting to be made on the baler or preferably from a control unit that can be located in an area other than on the manifold 94, such as adjacent the tractor seat.

In the initial bale building mode with the bale very small in diameter, rods 72' of each tensioning cylinder 68' begin to be pulled out, creating an oil flow. Oil exhausted from rod end E' flows through line 136' to inlet port RP' of solenoid valve 88' out of outlet port T' via lines 124', 130' and returns to piston end F'.

As the bale increases in size, a signal is sent to the solenoid valve 88' from a bale size sensing device S₁ on the baler 10 to start increasing the pressure such that the amount of effort to extend rod 72' of each tensioning cylinder 68' increases proportionally with the size of the bale. Solenoid valve 88' can be used to vary the bale density at any time during the bale building process by simply altering the electrical signal to the valve 88' whenever a bale density change is desired. For example, one signal is transmitted when starting a bale and building a soft bale core to the desired bale size, and another signal is sent increasing the pressure to maintain the high bale density when building the core of the bale. These previously mentioned density adjustments have been carried out by multi-valve circuits or mechanical arrangements such as springs with changing lever arms.

The bale ejection and tailgate opening/closing modes using solenoid valve 88' operate in the same fashion as previously described above in the mechanical type proportional valve arrangement.

As shown in FIG. 3, a charge circuit may be added to the main circuit for maintaining the pressure between each tensioning cylinder 68' and the solenoid valve 88'. Although the charge circuit is shown in connection with solenoid valve 88', it should be understood that such circuit can also be used with the hydraulic circuit of FIG. 2 where the charge circuit is defined by accumulator 86. Charge circuit comprises continuous pump 154 supplying oil from a separate source 156 via line 158 to the junction between rod end E' and inlet port RP'. The addition of charge pump 154 maintains steady, even pressure to each tensioning cylinder 68' which is especially useful when harvesting a light crop or when the crop is not feeding commensurately with the running baler. The inclusion of charge pump 154 will always maintain the desired compacting force on the bale and provides a welcome improvement over complex accumulator and spring arrangements used in the prior art.

The solenoid valve 88' and circuit shown in FIG. 3 is preferably controlled by a microprocessor 160 which can monitor signals from sensor S₁ which affects bale density. Other sensors S₂–S₆ on the baler could further monitor bale RPM, crop moisture, horsepower demands, belt tension, and bale weight. This electronic control concept can also be used to compensate for changing lever arm lengths in the belt take-up arms so as to maintain the desired belt tension during the entire bale building process. In addition, the electronic control could include a manual override to manually adjust the desired bale parameter.

Figure 4:
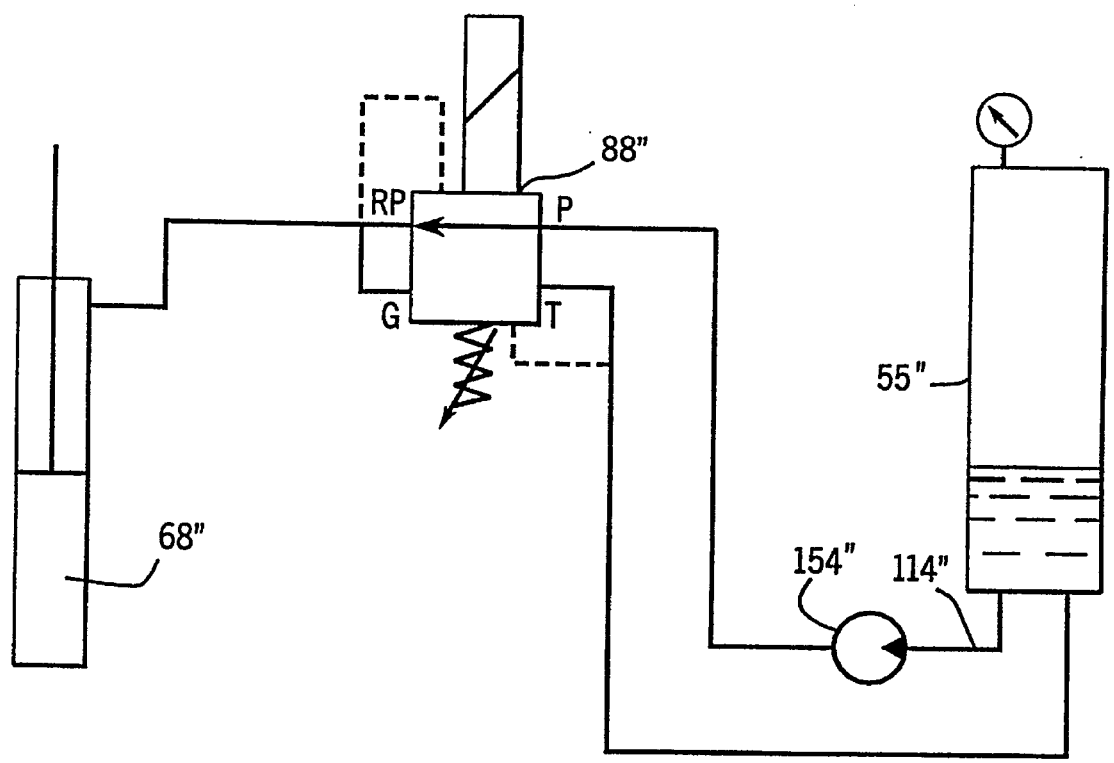
FIG. 4 is a schematic diagram of a second alternative hydraulic circuit provided by the present invention.

In FIG. 4, a singular solenoid type proportional valve 88" is placed in series with a charge pump 154" in fluid supply line 114" and is connected at one end to fluid source 55" and at the other end to tensioning cylinder 68". Return line 98" is connected at one end to solenoid proportional valve 88" and at the other end to fluid source 55". Again, in this version, solenoid valve 88" operates to control pressure requirements between the tensioning cylinder 68" and the source 55" and vary the bale density as desired. As long as fluid source 55" is pressurized, it should be appreciated that charge pump 154" may be eliminated.

It should be appreciated that the subject invention provides a hydraulic circuit for a variable chamber round baler that will control bale density and the actuation of the baler tailgate. The circuit employs a single proportional valve and an array of check valves to control the oil flow and pressure to and from the hydraulic cylinders that apply tension to the bale forming arrangement and provide for bale ejection. The hydraulic circuit is designed so that a central power source can be used to open and close the tailgate during bale ejection, return the belt take-up device to its start position and provide for various belt densities. Such operations are currently performed in the prior art by directional control valves which require two-directional oil flow into the bale tensioning circuit unlike the present invention which is a regenerative circuit that allows oil flow to enter the bale density circuit through one passage and exit through another.

While the invention has been described with reference to a preferred embodiment, those skilled in the art will appreciate that certain substitutions, alterations and omissions may be made without departing from the spirit thereof. Accordingly, the foregoing description is meant to be exemplary only, and should not be deemed limitative on the scope of the invention set forth with the following claims.

We claim:

1. A cylindrical baler for processing cylindrical bales, said baler comprising:

a front section;

a rear discharge tailgate connected to said front section;

a plurality of guide and tensioning rollers in said front section and said rear discharge tailgate;

a plurality of belts supported on and extending around said rollers for defining an expandable bale forming chamber and providing variable bale density, said tailgate being movable between an open position for bale discharge and a closed position for bale formation;

tensioning cylinder means for providing variable tension on said belts during bale formation;

tailgate cylinder means for providing actuation of said tailgate between said open position and said closed position;

pressurized fluid source means for supplying fluid to and returning fluid from said tensioning cylinder means and said tailgate cylinder means; and fluid circuit means including a singular, proportional valve means connected with supplementary valve means and located between said tensioning cylinder means and said tailgate cylinder means for controlling the pressure requirements between said tensioning cylinder means and said tailgate cylinder means, for controlling said variable bale density during said bale formation and for opening and closing said tailgate following said bale formation.

2. The baler of claim 1, wherein said proportional valve means is a solenoid valve.

3. The baler of claim 2, wherein said solenoid valve is located on the baler.

4. The baler of claim 2, wherein said solenoid valve is located remote from the baler.

5. The baler of claim 2, including sensing means located on the baler for sensing at least one of the size of the bale, the weight of the bale, the rotational speed of the bale, the torsion in said rollers, the tension in said belts and the moisture in the bale, and activating said solenoid valve.

6. The baler of claim 2, wherein said solenoid valve is controlled by a microprocessor.

7. The baler of claim 1, wherein said supplementary valve means comprises check valves.

8. The baler of claim 1, including charge circuit means connected between said proportional valve means and said tensioning cylinder means for providing a continuous pressure on said tensioning cylinder means.

9. The baler of claim 1, wherein said fluid source means is comprised of hydraulic fluid.

10. The baler of claim 1, wherein said fluid circuit means is regenerative through said proportional valve means to said tensioning cylinder means.

11. The baler of claim 1, wherein said variable bale density is continuously and automatically controllable by said proportional valve means.

12. A machine for forming cylindrical bales of crop having a variable volume baling chamber and a hydraulic system which includes a tensioning cylinder for providing variable bale density, a tailgate cylinder for enabling discharge of a formed bale from the baling chamber and a source of hydraulic fluid connectable to a rod end and a piston end of each tensioning cylinder and tailgate cylinder, the machine comprising:

a proportional valve connected between the tensioning cylinder and the tailgate cylinder;

a first fluid path having a first part supplying hydraulic fluid to the piston end of the tailgate cylinder and a second part returning hydraulic fluid from the rod end of the tailgate cylinder to the source;

a second fluid path having a first part supplying hydraulic fluid to the rod end of the tailgate cylinder and a second part returning fluid from the piston end of the tailgate cylinder to the source;

a third fluid path having a first part supplying fluid from one of said first fluid path and said second fluid path to said proportional valve and a second part returning fluid from said proportional valve to the source;

a fourth fluid path having a first part supplying fluid from one of said first fluid path and said second fluid path through said proportional valve to the rod end of the tensioning cylinder and a second part returning fluid from the piston end of the tensioning cylinder to the source; and a fifth fluid path interconnecting said first fluid path and said second fluid path.

13. The machine of claim 12, wherein said first part of said first fluid path includes at least one check valve providing flow between the source and the piston end of the tailgate cylinder.

14. The machine of claim 12, wherein said second part of said second fluid path includes a first heck valve and a fixed flow orifice in parallel and a second check valve between the piston end of the tailgate cylinder and the source, said second check valve being in communication with said first part of said second path.

15. The machine of claim 12, wherein said first part of said third fluid path includes a check valve and a filter between the source and said proportional valve and said second part includes a check valve between said proportional valve and the source.

16. The machine of claim 12, wherein said second part of said fourth fluid path includes a check valve between the piston end of the tailgate cylinder and the source.

17. The machine of claim 12, wherein a charge circuit is connected to said first part of said fourth fluid path between said proportional valve and the rod end of the tensioning cylinder.

18. The machine of claim 12, including an adjustable rotary valve and an adjustable relief valve connected between said proportional valve and the tensioning cylinder.

19. The machine of claim 18, including a sixth fluid path having a first part supplying fluid from the rod end of the tensioning cylinder through said rotary valve through said proportional valve and a second part returning fluid to the piston end of the tensioning cylinder.

20. The machine of claim 19, including a seventh fluid path having a first part supplying fluid from the rod end of the tensioning cylinder through said relief valve and a second part returning fluid to the piston end of the tensioning cylinder.

21. A cylindrical baler for processing cylindrical bales, said baler comprising:

a front section;

a rear discharge tailgate pivotally connected to said front section;

a plurality of guide and tensioning rollers in said front section and rear tailgate;

a plurality of belts supported on and extending around said rollers for defining an expandable bale forming chamber and providing variable bale density, said tailgate being movable between an open position for bale discharge and a closed position for bale formation;

tensioning cylinder means for providing variable tension on said belts during bale formation;

tailgate cylinder means for providing actuation of said tailgate between said open position and said closed position;

each of said tensioning cylinder means and said tailgate cylinder means having a rod end and a piston end;

fluid source means for supplying fluid to and returning fluid from tensioning cylinder means and said tailgate cylinder means; and fluid circuit means located between said tensioning cylinder means and said tailgate cylinder means, said fluid circuit means including:

a proportional valve;

an adjustable rotary valve connected to said proportional valve; and an adjustable relief valve connected to said rotary valve;

whereby during a bale formation phase, fluid flows initially from said rod end of said tensioning cylinder means through said rotary valve, through said proportional valve and back to said piston end of said tensioning cylinder means until the bale reaches a predetermined size after which fluid flows through said relief valve to said piston end of said tensioning cylinder means;

whereby during a bale ejection phase, fluid flows from said source means to said rod end of said tailgate cylinder means and from said rod end of said tailgate cylinder means back to said source means;

whereby after the bale is ejected, fluid flows from said source means to said rod end of said tailgate cylinder means and from said piston end of said tailgate cylinder means to said source means; and whereby depending on the pressure demands between said rod end of said tensioning cylinder means and said proportional valve, fluid flows through said proportional valve and returns to said source means.

22. A cylindrical baler for processing cylindrical bales, said baler comprising:

a front section;

a rear discharge tailgate connected to said front section;

a plurality of guide and tensioning rollers in said front section and rear tailgate;

a plurality of belts supported on and extending around said rollers for defining an expandable bale forming chamber and providing variable bale density;

tensioning cylinder means for providing variable tension on said belts during bale formation;

pressurized fluid source means for supplying fluid to and returning fluid from said tensioning cylinder means; and fluid circuit means including a singular, solenoid valve means connected to said tensioning cylinder means for controlling the pressure requirements of said tensioning cylinder means and said variable bale density during said bale formation.

* * * * *